United States Patent [19]

Gantzhorn, Jr. et al.

[11] Patent Number: 4,901,167
[45] Date of Patent: Feb. 13, 1990

[54] LOOP BIN

[75] Inventors: John E. Gantzhorn, Jr., Hockessin, Del.; Toshiaki Shima; Koichi Sota, both of Tokyo, Japan; Kwai-Yung B. Su, Hockessin, Del.

[73] Assignee: Otari Electric Company, Ltd., Japan

[21] Appl. No.: 174,495

[22] Filed: Mar. 25, 1988

[51] Int. Cl.⁴ .......................... G11B 5/86; B65H 20/24
[52] U.S. Cl. ........................................ 360/15; 226/119
[58] Field of Search ............................... 226/118, 119; 360/15-17

[56] References Cited

U.S. PATENT DOCUMENTS

| | | | |
|---|---|---|---|
| 2,808,259 | 10/1957 | Wengel | 271/2.15 |
| 3,332,595 | 7/1967 | Wetzler | 226/119 |
| 3,993,233 | 11/1976 | Bartell | 226/118 |
| 4,213,159 | 7/1980 | King | 360/16 |
| 4,589,580 | 5/1986 | Young, Jr. et al. | 226/119 |
| 4,591,084 | 5/1986 | Balian et al. | 226/118 |
| 4,698,701 | 10/1987 | Gantzhorn, Jr. et al. | 360/16 |

FOREIGN PATENT DOCUMENTS 5472513 of 0000 Japan .

OTHER PUBLICATIONS

Serial No. 096,962.
Serial No. 104,040.
Serial No. 130,280.

Primary Examiner—Vincent P. Canney
Attorney, Agent, or Firm—Flehr, Hohbach, Test, Albritton & Herbert

[57] ABSTRACT

A loop bin for an endless tape having long length contained in a zigzag fashion comprising a tape inlet from which the endless tape can be put in, a tape outlet from which the endless tape can be drawn out, and at least one tape transport mechanism provided substantially horizontal so as to divide an inside of the loop bin into cascading levels and for continuously feeding the zigzag endless tape on each level from the tape inlet to the tape outlet.

3 Claims, 2 Drawing Sheets

LOOP BIN

BACKGROUND OF THE INVENTION

1. Field of the Invention

The present invention relates to a loop bin for use in a tape transport arrangement, particularly to a loop bin for use in contact printing tape transport arrangements that can transport an endless magnetic tape and contain it in a zigzag line in its course of transportation.

2. Description of the Prior Art

Widespread use of home video recording and playback equipment has increased the demand for prerecorded cassettes, especially half-inch video cassettes. Fast production of such cassettes is difficult, because video signals contain a large amount of information which must be reproduced with a high degree of accuracy to maintain adequate image and color standards.

At present, the preferred video recording method used by this industry is to use upward of 1,000 recording machines, all operating simultaneously, all receiving a realtime signal from one master playback machine to produce multiple copies. The logistics of providing, loading, unloading, operating and maintaining such multitude of relatively complex equipment makes reproduction a very expensive process.

Another approach to magnetic recording duplication is non-realtime duplication known as magnetic replication. In this type of duplication, the signal pattern from a master tape is replicated directly on the receiving tape at very high speed. The magnetic pattern in this process is copied onto a receiving tape in much the same way as a visible image is printed through a high speed press onto a sheet of paper. As a result, the term contact printing has sometimes been used to designate a process of transferring information contained in one recording medium to a second recording medium directly, without an intermediate step of generating an electrical signal. Copy speeds in excess of 100 times realtime duplication have been reported.

A tape replication technique has been developed as a method for duplicating a recorded tape on which a signal was recorded earlier (hereafter referred to as a master tape) onto a blank tape on which no signal has been recorded (hereafter referred to as a copy tape). When this tape replication technique is implemented, the magnetic medium surface of a master tape is pressed toward the magnetic medium surface of a copy tape, and an external magnetic field or heat is applied to an overlapping area. As a result, a reversed image (i.e., mirror image) of the signal recording pattern recorded on the master tape is formed on the magnetic medium surface of the copy tape, and the duplication is thus completed. If the aforementioned transfer duplication technique is implemented, duplication can be carried out quite efficiently even if video tapes and PCM recording tapes on which complicated signal recording patterns have been impressed are employed, since the transfer is carried out by simultaneously transporting the master tape and copy tape.

It is desirable to use a system which does not require a step of rewinding the master tape after it has been recorded once. For this purpose the master tape should be made of an endless loop. An example of arrangements for transporting such an endless-loop master tape was disclosed in a Japanese Utility Model Laid-Open Publication No. 54-72513. In this arrangement, a loop bin is provided virtually perpendicular to a panel base so as to contain the master tape in a zigzag line in parts of the transport course. U.S. Pat. Nos. 4,213,159 and 4,698,701 each disclose a tape transporting device wherein the front and rear ends of a master tape are connected to form an endless loop and a copy tape is transported between a pair of reels, i.e., a feeding reel and a winding reel. In these arrangements, the endless master tape is continually fed into a loop bin and is piled on top of itself in an overlapping or zigzag fashion. This creates a problem. The lower part of the master tape piled at the bottom of the loop bin can become creased and distorted since the lower part of the piled tape cannot endure the weight of the upper piled part of the master tape. The problem is particularly noticeable in tape duplication systems. This is because the copy tape is produced as the master tape is distorted.

An object of the present invention is to provide an improved loop bin for an endless master tape in a contact printing system that minimizes the above-mentioned defects.

SUMMARY OF THE INVENTION

The invention relates to a loop bin for storing a portion of an endless tape in a zigzag configuration. The loop bin comprises an inlet for receiving the tape portion and an outlet from which the tape portion can be drawn out. At least one tape transport mechanism divides an inside of the loop bin into levels. Each tape transport mechanism is generally horizontal. Each transport mechanism is for continuously transporting the zigzag tape portion on each level. Each transport mechanism comprises at least one drive roller, at least one rotatable roller and at least one belt around the rollers.

In the preferred embodiment, there are three transport mechanisms dividing the loop bin into three levels. Further, each transport mechanism further comprises a plurality of rotatable rollers having grooves interconnected by a plurality of belts in the grooves. Each of the two highest transport mechanisms has a rotatable guide pole at its downstream end. The lowest transport mechanism is generally along a bottom of the loop bin. The highest mechanism has a part which is movable between two positions such that when the part is in a lowered position the tape portion is adapted to travel on all three mechanisms and when the part is in a raised position the tape portion bypasses the higher two mechanisms, falls on the lowest mechanism, and is transported in a zigzag fashion thereon generally in the direction of the loop bin outlet. The middle mechanism extends beyond an end of the highest mechanism to receive the tape portion that falls from the end of the highest mechanism. The lowest mechanism extends beyond an end of the middle mechanism to receive the tape portion that falls from the middle mechanism end. The rollers of the highest and lowest mechanisms rotate in a first direction and the rollers of the middle mechanism rotate in a second direction so that tape transported by the top and bottom mechanisms travels generally in one direction and tape transported on the middle mechanism travels generally in the opposite direction.

The above-described loop bin can be used in a magnetic tape recording system which produces a reversed image of the image on an endless master tape onto a copy tape. The system includes a contact printing station for receiving the tapes and producing the reversed image, a supply reel for supplying the copy tape, a rewind reel for rewinding the copy tape, copy tape tension detection and control means, master tape tension and control means, tape drive means for transporting the tapes, and the loop bin.

BRIEF DESCRIPTION OF THE DRAWINGS

The invention can be more fully understood from the following detailed description thereof taken in connection with accompanying drawings which form a part of this application and in which.

DESCRIPTION OF THE PREFERRED EMBODIMENT(S)

Figure 1:
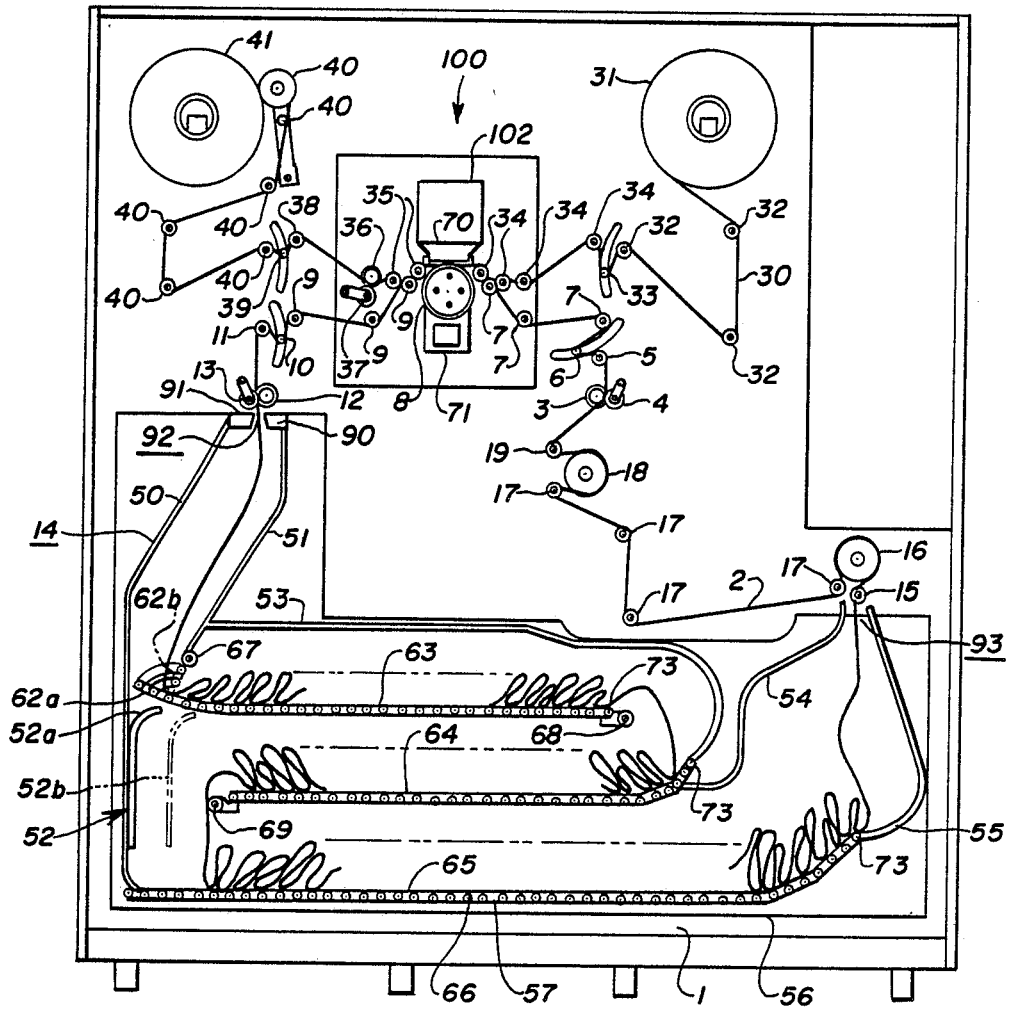
FIG. 1 is a front view of a tape duplicating system comprising a contact printing station, a copy tape, an endless master tape, and a loop bin of the present invention for a portion of the master tape.

Throughout the following detailed description, similar reference numerals refer to similar elements in all Figures of the drawings.

FIG. 1 is an illustration of a front view of a loop bin 14 of the present invention in a tape duplicating system. The loop bin 14 is shown on a lower part of FIG. 1. A numeral 1 indicates a panel base, which is installed substantially perpendicular to a floor. A numeral 2 indicates a master tape of long length in an endless loop fashion. The master tape 2 can be turned counterclockwise through a route that includes the loop bin 14 and a contact printing station 100. The contact printing station 100 is shown on an upper part of FIG. 1.

The contact printing station 100 comprises an energy applying means 102 and a pressure applying means 8 and 70. The energy applying means can be a heat source, such as a laser, a magnetic field or other means. The pressure applying means comprises an air cap 70 and a backup or transfer roller 8. The master tape 2 is transported between the air cap 70 and the backup roller 8. A numeral 30 indicates a copy tape, which can be transported at a certain constant speed from a supply reel 31 to a rewind reel 41 and between the air cap 70 and the backup roller 8 as in the course of the travelling route of the master tape 2. The copy tape 30 is printed on when it is superimposed on the master tape 2 at the contact printing station 100. The master tape 2 also can be transported at the same speed as the copy tape by intimately contacting the copy tape 30 with the master tape 2 in the contact printing station and driving one or both of the tapes.

The parts of the preferred embodiment of the present invention will now be described. The loop bin 14 is made up of guide rails 50, 51, 52, 53, 54, and 55, and tape transport mechanisms 63, 64, 65. The guide rails 50, 51, 52, 53, 54, and 55 are made of bands or strips of wider width than the master tape 2 which are supported on the panel base 1. Referring to FIG. 1, the guide rail 52 can be moved between a position 52a shown by solid lines and a position 52b shown by dotted lines. A numeral 56 indicates a glass plate, which is provided on the guide rails 50, 51, 52, 53, 54, and 55, thereby forming a space between the plate 56 and the base 1 in which the master tape 2 can be contained. There are provided tape inlet blocks 90 and 91. The master tape 2 can be put into the loop bin 14 from a tape inlet 92 provided between the tape inlet blocks 90 and 91. There also is provided between the guide rail 54 and 55 a tape outlet 93 from which the master tape 2 can be drawn out from the loop bin 14.

Figure 2:
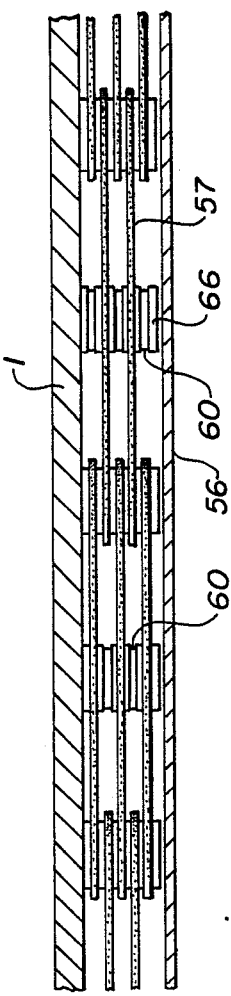
FIG. 2 is an enlarged view of part of a master tape transport mechanism within the loop bin.

Tape transport mechanisms 63, 64, and 65 are provided so as to divide the inside of the loop bin 14 into three substantially horizontal sections or levels. FIG. 2 is an enlarged partial view of one of the tape transport mechanisms 63, 64 and 65 as looked downward in FIG. 1. Each of the tape transport mechanisms 63, 64, and 65 is made up of a drive roller 73, a plurality of rotatable rollers 66 and a plurality of belts 57. The rotatable rollers 66 are provided in a line on the panel base 1. Each of the rotatable rollers 66 has five belt grooves 60 provided thereon with equal distances between adjacent grooves. Each of the belts 57 is made up of circular rubber or the like, having a circular cross-section. The belts 57 are put on the belt grooves 60 of the rotatable rollers 66 as shown. Specifically, every other roller 66 has a belt 57 in each of its five grooves 60. Three of the five belts 57, the middle belt and the two end belts, extend in a first and the same direction, either upstream or downstream of the tape, past and contacting sides of an adjacent roller 66, to and around corresponding grooves of the next roller 66. The other two of the five belts 57 extend the opposite direction in comparison to the first direction, past and contacting sides of an adjacent roller 66, to and around corresponding grooves of the next roller 66.

A drive roller 73, which is provided at a right end in FIG. 1 of each one of the tape transport mechanisms 63, 64, and 65, can be rotated at a certain constant speed by a motor. The rotational power of the drive roller 73 is successively transmitted to the rotatable rollers 66 through the belts 57, which can transport the master tape 2 piled thereon in a zigzag fashion. A part of the tape transport mechanism 63 can move between a position 62a indicated by a solid line in FIG. 1 and position 62b indicated by a dotted line also in FIG. 1, depending on the length of the master tape 2.

There are provided guide poles 67, 68 and 69 that can be rotated. Guide pole 67 is at a lower end of guide rail 51. Guide pole 68 is at the right end of tape transport mechanism 63 in FIG. 1. Guide pole 69 is at the left end of tape transport mechanism 64 in FIG. 1. These guide poles can effectively function when the master tape 2 is first started into the loop bin 14 before the tape transport mechanisms 63, 64, and 65 are activated by rotating the drive rollers 73 or when the master tape 2 is pulled out of the loop bin 14 after the drive rollers 73 are turned off. Without the guide poles 67, 68 and 69, the master tape 2 on the tape transport mechanisms 63 and 64 may not be able to be pulled out of the tape outlet 93 due to the friction of the master tape 2 with the belts 57. With the aid of the guide poles 67, 68. and 69, the master tape 2 can be readily pulled out and not caught by the belts 57 even when the belts 57 are stopped.

The following describes the upper section of FIG. 1. Numerals 5, 7, 9, 11, 15, 17, and 19 indicate guide rollers that are all rotatably mounted on axes perpendicular to the panel base 1. Numerals 16 and 18 indicate brake rollers that also are rotatably mounted on axes perpendicular to the panel base. The brake rollers 16 and 18 can exert a resistance to turning. Numerals 6 and 10 indicate master tape tension detection means that are mounted movably in an arc line in parallel with the panel base 1 for detection of tension of the master tape 2. Numerals 3 and 12 indicate master tape capstans that can be rotated by respective motors to provide a certain constant tension of the master tape 2 under control of the master tape tension detection means 6 and 10. Numerals 4 and 13 indicate master tape pinch rollers that can press the master tape 2 to the respective master tape capstans 3 and 12 to make the master tape 2 run.

Numerals 32, 34, 35, 38, and 40 indicate guide rollers that are rotatably mounted on axes perpendicular to the panel base 1. Numerals 33 and 39 indicate copy tape tension detection means that are mounted movably in an arc line in parallel with the panel base 1 for detection of tension of the copy tape 30. The supply reel 31 and the rewind reel 41 can be rotated by respective motors to provide a certain constant tension of the copy tape 30 under control of the copy tape tension detection means 33 and 39. A numeral 36 indicates a copy tape capstan that can be rotated at a certain constant speed by a motor. A numeral 37 indicates a copy tape pinch roller that can press the copy tape 30 to the copy tape capstan 36 to transport the copy tape 30.

As can be seen from the above description, there are provided four independent control systems. Tape tensions can be detected by the tension detection means 6, 10, 33, and 39, the results of which are used to control the master tape capstans 3 and 12, the supply reel 31 and the rewind reel 41, respectively. This assures that the master tape 2 and the copy tape 30 can be kept at certain constant tensions at the contact printing station 100.

Air cap 70 is mounted on the panel base 1. The air cap 70 blasts compressed air to the backup roller 8. A numeral 71 indicates a cylinder retaining block that is mounted on the panel base 1 to rotatably hold the backup roller 8.

The following describes operation of the preferred embodiment in an order of the running route of the endless-loop master tape 2. The master tape 2 can be fed into the loop bin 14 by the master tape capstan 12 and the master tape pinch roller 13. The master tape 2 can fall in between the guide rails 50 and 51. For a long master tape, a movable part of the tape transport mechanism 63 is positioned at solid line 62a, and the guide rail 52 is positioned at solid line 52a. The master tape 2 can be transported by the tape transport mechanism 63 in the zigzag fashion. The piled master tape 2 can be piled on the tape transport mechanism 63 toward the guide pole 68 between the guide rail 53 and the tape transport mechanism 63. The piled master tape 2 can fall onto the tape transport mechanism 64 from the guide pole 68. In turn, the master tape 2 can be transported toward the guide pole 69 between the tape transport mechanism 63 and 64. The master tape 2 can fall onto the tape transport mechanism 65 from the guide pole 69. In turn, the master tape 2 can be transported toward the guide rail 55 between the tape transport mechanisms 64 and 65. When the master tape 2 reaches the guide rail 55, it can be drawn out of the loop bin 14.

In general, the length of the master tape 2 may vary, and the master tape 2 has to be uniformly dispersed on the tape transport mechanisms 63, 64, and 65. This can be done in a way that the transport speed of the master tape 2, that is, the rotational speed of the drive roller(s) 73, can be adjusted depending on the length of the master tape 2. If the length of the master tape 2 is too short to use all three tape transport mechanisms 63, 64 and 65, then the movable part of the tape transport mechanism 63 can be moved from the solid line position 62a to the dotted line position 62b, and the guide rail 52 can be moved from the solid line position 52a to the dotted line position 52b. In this state, the master tape 2 in the loop bin 14 can be piled onto the tape transport mechanism 65 in the zigzag fashion between the guide rails 50 and 52b. The piled master tape 2, in turn, can be transported toward the guide rail 55 by the tape transport mechanism 65.

After being drawn out of the loop bin 14, the master tape 2 can be transported to the capstan 3 past the guide roller 15, the brake roller 16, guide rollers 17, the brake roller 18, and the guide roller 19. The brake rollers 16 and 18 have some resistance to rotating. This can give a tension to the master tape 2 that is freely drawn, i.e., without tension, out of the loop bin 14. The capstan 3 can be controlled so that the tension detected by the master tape tension detection means 6 can be kept constant. The master tape 2 can be fed by the guide roller 5, the master tape tension detection means 6, and the guide rollers 7 and can be superimposed at the contact printing station 100 onto the copy tape 30 running at the same constant speed. The master tape 2 can be fed at the same speed as the copy tape 30 by driving one of the tapes as a result of the friction between the tapes at the contact printing station. The master tape 2, further, can be fed into the loop bin 14 again from the contact printing station 100 through the guide rollers 9, the master tape tension detection means 10, the guide roller 11, the capstan 12, and the pinch roller 13. The capstan 12 can be controlled so that the tension detected by the master tape tension detection means 10 can be kept constant.

In turn, the following describes operation of the preferred embodiment in an order of the running route of the copy tape 30. The copy tape 30 having a long length wound on the supply reel 31 can be transported to the contact printing station 100 past the guide rollers 32, the copy tape tension detection means 33, and the guide rollers 34. The supply reel 31 can be controlled so that the tension detected by the copy tape tension detection means 31 can be kept constant. The copy tape 30 is fed from the contact printing station 100 by the guide roller 38, the copy tape tension detection means 39, and the guide rollers 40, and then can be wound on the rewind reel 41. The copy tape pinch roller 37 presses the copy tape 30 to the copy tape capstan 36 revolving a certain constant speed to transport the copy tape 30. The rewind reel 41 can be controlled so that the tension detected by the copy tape tension detection means 39 can be kept constant.

In the preferred embodiment, the inside of the loop bin 14 is divided into three generally horizontal paths by locating the transport mechanisms 63 and 64 spaced from one another and from the lowest transport mechanism 65. The master tape 2 can be continuously transported on all three cascading levels in a zigzag pattern on each mechanism. This design has been referred to as a cascading loop bin. The number of the tape transport mechanisms can be changed depending on the length of the master tape 2 and the number of the paths desired in the loop bin 14.

As can be seen from the above description of the loop bin according to the present invention, the master tape piled in the zigzag fashion on the tape transport mechanism(s) can be moved substantially horizontally by the tape transport mechanism(s) before much of the tape can pile up. The master tape, therefore, can be dispersed in a wider section in the loop bin. This results in reduction of load applied to the lowest parts of the piled master tape.

Also, in the above-described embodiment, each of the tape transport mechanisms has one drive roller 73 and a plurality of rotatable rollers 66 arranged in a line, which are connected by a plurality of belts 57. It should be noted, however, that one or more of the tape transport mechanisms can be made up of one drive roller, one rotation roller, and a belt, e.g., a flat belt, connecting the two rollers only. Alternatively, the tape transport mechanism can have a plurality of drive rollers and a plurality of rotatable rollers connected by one or more belts.

Further, it is not necessary that the loop bin be perpendicular to the floor, but it can be inclined to a degree while maintaining the effects of the present invention.

As described above, the loop bin according to the present invention can achieve such an effect that it can prevent the master tape from being bent or distorted even if a master tape of long length is contained in the loop bin. This results in such an advantage that the signals reprinted on the copy tape can be free or substantially free of distortion due to creases in the master tape. This means that the quality of the copy tape can be improved. In addition, the master tape itself can be made to provide a long service life as it can be protected from injury.

Those skilled in the art, having the benefit of the teachings of the present invention as hereinabove set forth, can effect numerous modifications thereto. These modifications are to be construed as being encompassed within the scope of the present invention as set forth in the appended claims.

We claim:

1. In a magnetic tape recording system of the type having a contact printing station for receiving a copy tape and an endless master tape and producing a reversed image of the image on the master tape onto the copy tape, a supply reel for supplying the copy tape, a rewind reel for rewinding the copy tape, copy tape tension detection and control means, master tape tension detection and control means, tape driving means for transporting the tapes, and a loop bin for storing a portion of the master tape in a zigzag fashion, the loop bin having an inlet and an outlet, the improvement which comprises:
   means capable of dividing the loop bin into cascading levels for continuously transporting the zigzag master tape portion on each level, wherein
   said means for transporting comprises at least one drive roller and a plurality of rotatable rollers having grooves interconnected by a plurality of belts in the grooves.

2. In a magnetic tape recording system of the type having a contact printing station for receiving a copy tape and an endless master tape and producing a reversed image of the image on the master tape onto the copy tape, a supply reel for supplying the copy tape, a rewind reel for rewinding the copy tape, copy tape tension detection and control means, master tape tension detection and control means, tape driving means for transporting the tapes, and a loop bin for storing a portion of the master tape in a zigzag fashion, the loop bin having an inlet and an outlet, the improvement which comprises:
   means capable of dividing the loop bin into cascading levels for continuously transporting the zigzag master tape portion on each level, wherein
   said means for transporting is a generally horizontal transport mechanism and comprises a rotatable guide pole at a downstream end of said transport mechanism.

3. In a magnetic tape recording system of the type having a contact printing station for receiving a copy tape and an endless master tape and producing a reversed image of the image on the master tape onto the copy tape, a supply reel for supplying the copy tape, a rewind reel for rewinding the copy tape, copy tape tension detection and control means, master tape tension detection and control means, tape driving means for transporting the tapes, and a loop bin for storing a portion of the master tape in a zigzag fashion, the loop bin having an inlet and an outlet, the improvement which comprises:
   means capable of dividing the loop bin into cascading levels for continuously transporting the zigzag master tape portion on each level, wherein
   said means for transporting comprises three generally horizontal transport mechanisms, said mechanisms further comprising a first mechanism generally along a bottom of the loop bin, a second mechanism generally above the first mechanism and a third mechanism generally above the second mechanism, and wherein said second mechanism extends beyond an end of said third mechanism to receive the tape portion that falls from the end of said third mechanism; and said first mechanism extends beyond an end of said second mechanism to receive the tape portion that falls from the end of said second mechanism.

* * * * *